US006526870B2

(12) United States Patent
Takanashi et al.

(10) Patent No.: US 6,526,870 B2
(45) Date of Patent: Mar. 4, 2003

(54) FLUID PRESSURE CYLINDER

(75) Inventors: Seiji Takanashi, Ibaraki (JP); Koichiro Kanda, Ibaraki (JP); Satoshi Suzuki, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/768,283

(22) Filed: Jan. 25, 2001

(65) Prior Publication Data

US 2001/0016090 A1 Aug. 23, 2001

(30) Foreign Application Priority Data

Feb. 18, 2000 (JP) ....................................... 2000-040987

(51) Int. Cl.[7] ........................... F16C 32/06; F15B 11/06

(52) U.S. Cl. ...................... 92/177; 92/165 PR; 384/100; 384/194; 384/12

(58) Field of Search ................................ 384/100, 194, 384/12; 92/165 PR, 177

(56) References Cited

U.S. PATENT DOCUMENTS

| | | | | |
|---|---|---|---|---|
| 3,319,543 A | * 5/1967 | Boonshaft | .................... | 404/35 |
| 4,119,017 A | * 10/1978 | Nusbaumer et al. | .......... | 92/108 |
| 4,207,807 A | * 6/1980 | Takata et al. | ................. | 403/30 |
| 4,644,851 A | * 2/1987 | Young | ......................... | 417/437 |
| 4,746,252 A | * 5/1988 | Jesinger | ....................... | 279/141 |
| 4,773,282 A | * 9/1988 | Benton et al. | .............. | 403/267 |
| 4,798,478 A | * 1/1989 | Crystal | ........................ | 384/12 |
| 4,932,313 A | 6/1990 | Gutknecht | | |
| 5,493,953 A | * 2/1996 | Bolthouse et al. | ............ | 384/11 |
| 6,318,243 B1 | * 11/2001 | Jones | .......................... | 92/189 |

FOREIGN PATENT DOCUMENTS

| | | |
|---|---|---|
| DE | 3435964 | * 9/1984 |
| JP | 09-285554 | * 10/1997 |
| JP | 10312617 | * 11/1998 |
| JP | 11-117912 | 4/1999 |

* cited by examiner

*Primary Examiner*—Chong H. Kim
*Assistant Examiner*—Julie K. Smith
(74) *Attorney, Agent, or Firm*—Oblon, Spivak, McClelland, Maier & Neustadt, P.C.

(57) ABSTRACT

A circular piston and a noncircular rod are separately formed as separate parts and the piston and the rod are integrally connected to each other through an adhesive in a state in which the piston is aligned to be concentric with a circular bearing hole of a first air bearing and the rod is aligned to be concentric with a noncircular bearing hole of a second air bearing.

8 Claims, 3 Drawing Sheets

FLUID PRESSURE CYLINDER

TECHNICAL FIELD

The present invention relates to a fluid pressure cylinder in which a circular piston and a noncircular rod connected to each other are respectively and movably supported by air bearings in a main body block.

PRIOR ART

A cylinder system in which a piston and a rod are supported in floating states by air bearings provided to a cylinder block is already known from Japanese Patent Application Laid-open No. 11-117912, for example.

Because the piston and the rod are supported by the air bearings in the proposed cylinder system, sliding resistance of the members can be reduced. However, because outside shapes of both the piston and rod are circular, the members may rotate in their strokes.

However, problems may occur in general if the piston and the rod rotate in operation, there is a desire to prevent rotation of the members in their strokes.

In order to prevent rotation of the piston and the rod, means for preventing rotation may be provided simply. However, if the piston and the rod are supported in the floating states by the air bearings as described above, a mechanism that does not impair functions of supporting in the floating states is necessary. For this purpose, it is easy and proper to form a section of the rod that has a smaller sectional area than the piston into a square or a rectangle. However, it is extremely difficult to integrally form the circular piston and the noncircular rod in a state in which the piston and the rod are kept completely concentric with each other. It is similarly difficult to accurately process the air bearing having a circular bearing surface for supporting the piston and the air bearing having a noncircular bearing surface for supporting the rod such that the bearings are concentric with each other. Therefore, it is extremely difficult to support the above circular piston and noncircular rod concentrically with each other by the air bearings. In order to accurately produce the piston and rod and to stably carry out supporting of the piston and rod in the floating states by the air bearings, an extremely complicated and highly accurate producing process is necessary and it is difficult to easily produce such a fluid pressure cylinder at low cost.

DISCLOSURE OF THE INVENTION

It is a technical object of the present invention to obtain a fluid pressure cylinder which can be produced easily and at low cost and in which a circular piston and a noncircular rod are supported accurately and concentrically with each other respectively by air bearings.

To achieve the above object, according to the present invention, there is provided a fluid pressure cylinder comprising a first air bearing having a circular bearing hole, a second air bearing having a noncircular bearing hole, a circular piston movably housed in the circular bearing hole, and a noncircular rod movably housed in the noncircular bearing hole. The piston and the rod are formed separately as separate parts and the piston and the rod are integrally connected to each other through an adhesive in a state in which the piston is aligned to be concentric with the circular bearing hole of the first air bearing and the rod is aligned to be concentric with the noncircular bearing hole of the second air bearing.

According to the invention with the above structure, because the circular piston and the noncircular rod are bonded to each other in a state in which the piston and the rod are respectively kept concentric with the corresponding air bearings, it is unnecessary to integrally form the piston and the rod in a state in which the piston and the rod are kept concentric with each other. It is similarly unnecessary to accurately process the first air bearing having a circular bearing surface and the second air bearing having a noncircular bearing surface such that the bearings are concentric with each other. Therefore, processing of the respective members is easy and the cylinder can be produced easily at low cost.

According to a concrete embodiment of the invention, the piston has a housing portion for housing the adhesive and a supply hole for supplying the adhesive in the housing portion to junction faces of the piston and the rod.

More concretely, the piston is in a closed-end cylindrical shape having therein a hollow portion that is the housing portion for the adhesive, the piston has the junction face to which the rod is bonded and the supply hole connecting the junction face and the hollow portion at a bottom portion of the piston, and the rod has the junction face to be bonded to the junction face of the piston on an upper end face of the rod.

In the invention, it is preferable that the fluid pressure cylinder has provisionally fixing means for provisionally fixing the piston and the rod to each other for alignment in a non-fixed state.

The provisionally fixing means is formed of a bolt and the bolt is screwed down into the rod in a non-fixed state through the supply hole for the adhesive in the hollow portion in the piston.

It is preferable that a weight of the rod is reduced by providing a plurality of holes for lightening in positions of the rod symmetric with respect to a center of the rod.

The rod may have an air passage for causing fluid pressure or vacuum pressure to act at a tip end portion of the rod.

DETAILED DESCRIPTION

Figure 1:
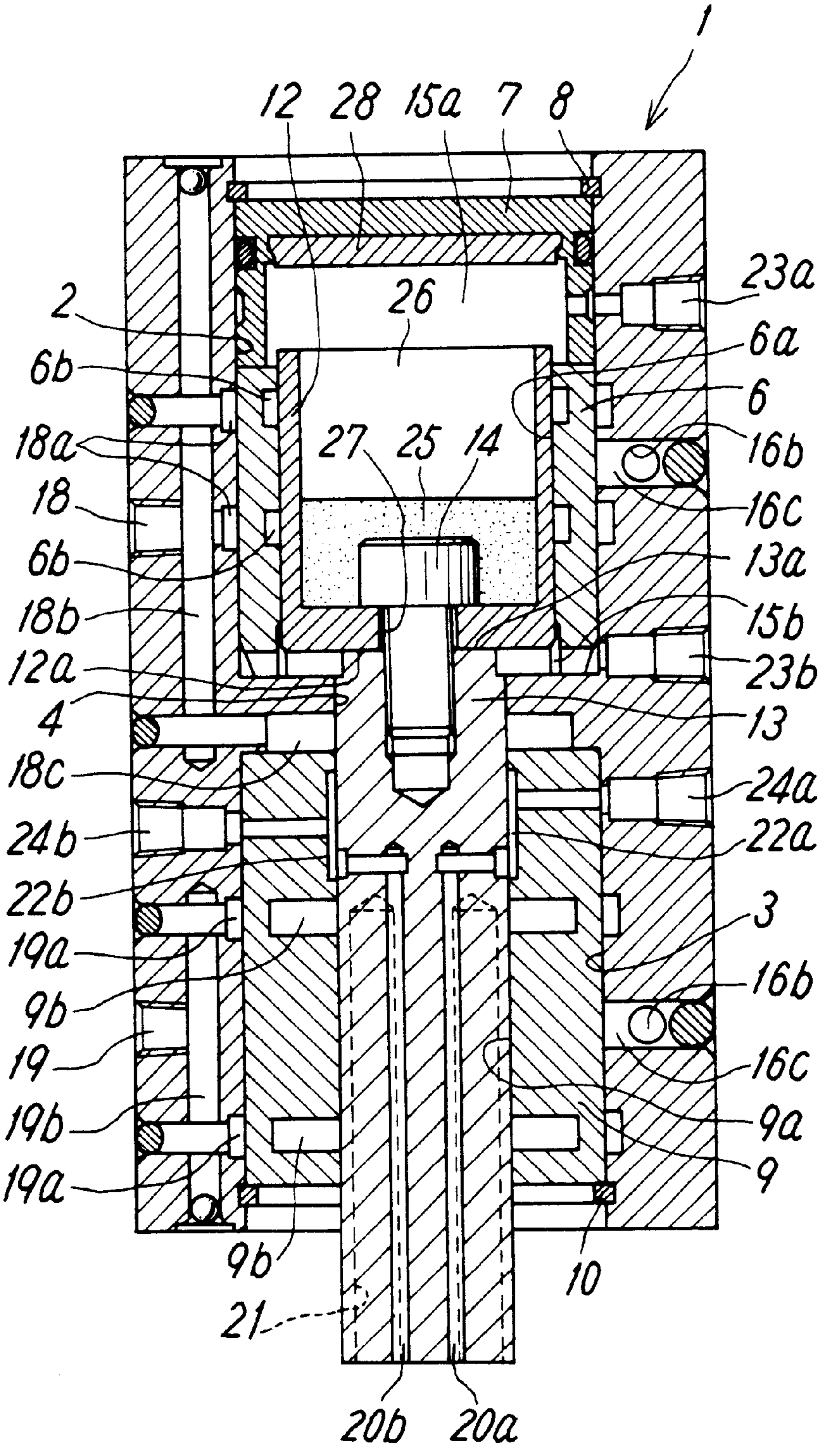
FIG. 1 is an enlarged vertical sectional front view of an embodiment of a fluid pressure cylinder according to the invention.

A fluid pressure cylinder shown in FIG. 1 has a main body block 1 in a shape of a rectangular parallelepiped. In the main body block 1, a circular first bearing mounting hole 2 and a second bearing mounting hole 3 having the same inside diameters are formed concentrically from opposite end faces in an axial direction and a small-diameter rod insertion hole 4 for connecting both the bearing mounting holes 2 and 3 is formed between the bearing mounting holes 2 and 3 to be concentric with the mounting holes 2 and 3.

In the first bearing mounting hole 2, a cylindrical first air bearing 6 having a circular bearing hole 6*a* in its central portion is fitted and a circular cap 7 for closing an end portion of the bearing mounting hole 2 is airtightly fitted, and the first air bearing 6 and the cap 7 are fixed by a snap ring 8. In the second bearing mounting hole 3, a circular second air bearing 9 having a square bearing hole 9*a* in its central portion is fitted and fixed by a snap ring 10.

Figure 6:
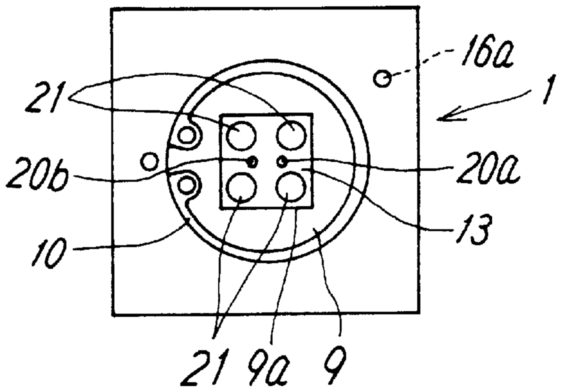
FIG. 6 is a bottom view of the embodiment.

In the circular bearing hole 6*a* of the first air bearing 6, a piston 12 in a shape of a closed-end cylinder with an open upper end side in FIG. 1 is inserted for sliding movement. In the square bearing hole 9*a* of the second air bearing 9, a rod 13 having a square section as can be seen from FIG. 6 is inserted for sliding movement. The piston 12 and the rod 13 are in contact with each other at a flat junction face 12*a* provided to a bottom face of the piston 12 and a flat junction face 13*a* provided to an upper end face of the rod 13 and are connected to and integrated with each other through an adhesive applied to the junction faces by a method described later.

The air bearings 6 and 9 are formed of porous breathing raw material into circular-cylindrical shapes. A bearing surface of an inner face of the circular bearing hole 6*a* in the first air bearing 6 is formed into a predetermined shape by reamer processing and a bearing surface of an inner face of the rectangular bearing hole 9*a* in the second air bearing 9 is formed into a predetermined shape by electrical discharge machining. Although the bearing surfaces of the air bearings 6 and 9 are processed with the aim of obtaining concentricity of the bearing surfaces with each other, it is unnecessary to obtain the concentricity with especially high accuracy.

Although the most suitable sectional shape of the rod 13 is a square because processing is relatively easy and because there is no action of an unbalanced load, the sectional shape is not limited to the square but may be a noncircular sectional shape such as a rectangle and a regular polygon.

Figure 2:
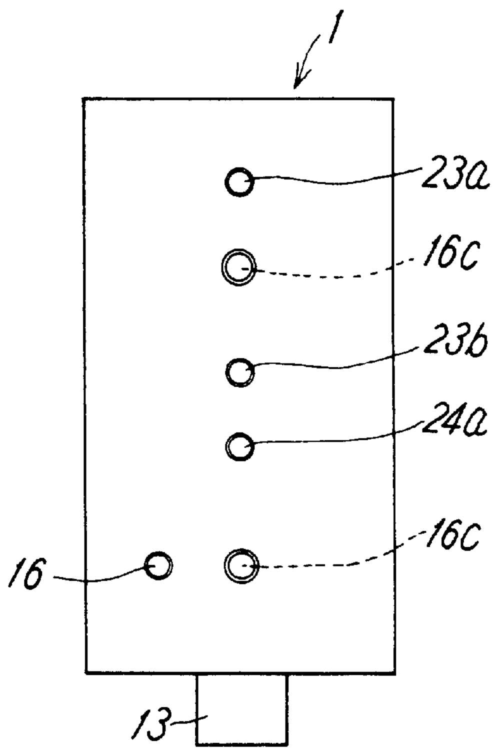
FIG. 2 is a right side view of the embodiment in FIG. 1.
Figure 5:
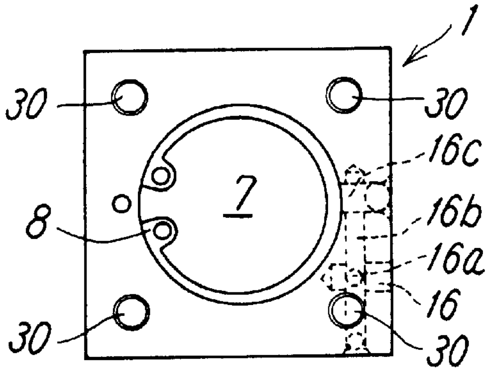
FIG. 5 is a plan view of the embodiment.

The main body block 1 is provided with a supply port 16 for supplying compressed air for the bearings, a through hole 16*a* communicating with the supply port and extending in parallel to an axis of the main body block 1, upper and lower two through holes 16*b*, 16*b* (see FIG. 1) extending from the through hole 16*a* in such a direction as to be orthogonal to the through hole 16*a*, and through holes 16*c* opening from the respective through holes 16*b*, 16*b* into substantially central positions of outer peripheral faces of the respective air bearings 6 and 9 as shown in FIGS. 2 and 5. Compressed air supplied through the through holes 16*c* to the outer peripheral faces of the respective air bearings 6 and 9 uniformly spouts into the bearing holes 6*a* and 9*a* through insides of the porous air bearings 6 and 9, thereby supporting the piston 12 and the rod 13 in a floating state in which the piston 12 and the rod 13 are not substantially in contact with the bearing surfaces.

Figure 3:
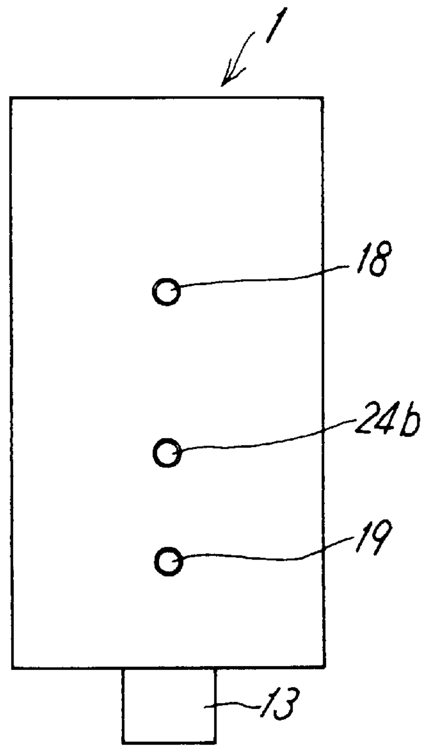
FIG. 3 is a left side view of the embodiment.

Air discharged to an outside from the air bearings 6 and 9 is discharged to the outside from discharge ports 18 and 19 formed in the main body block 1 for bearing air through peripheral grooves 18*a* and 19*a* on upper and lower opposite sides of the through holes 16 in the main body block 1 and through holes 18*b* and 19*b* extending from the peripheral grooves 18*a* and 19*a* to be parallel to the axis of the main body block 1 (see FIGS. 1 and 3). On inner faces of the bearing holes 6*a* and 9*a* in the respective air bearings 6 and 9, air collecting grooves 6*b* and 9*b* are respectively formed in positions corresponding to the peripheral grooves 18*a* and 19*a*.

In the rod 13, two air passages 20*a* and 20*b* extending axially and four lightening holes 21 are formed in such positions as to be symmetric with respect to an axial center of the rod 13 as shown in FIGS. 1 and 6. On the other hand, in the main body block 1, a supply port 24*a* for supplying compressed air to the air passage 20*a* and a vacuum pressure port 24*b* for causing vacuum pressure to act on the air passage 20*b* are formed. On the bearing surface of the second air bearing 9, a groove 22*a* for connecting the supply port 24*a* and the air passage 20*a* and a groove 22*b* for connecting the vacuum pressure port 24*b* and the air passage 20*b* are formed separately. These grooves 22*a* and 22*b* are formed to be long in an axial direction of the air bearing and the lengths of the grooves 22*a* and 22*b* are larger than a stroke of the rod 13. As a result, the ports 24*a* and 24*b* are respectively and constantly connected to the air passages 20*a* and 20*b* regardless of the stroke of the rod 13 and fluid pressure or vacuum pressure can be caused to act on a tip end portion of the rod 13 through the main body block 1.

By providing the plurality of lightening holes 21 to the rod 13 and by forming the piston 12 into the closed-end cylindrical body, it is possible to educe weights of these members as compared with a case in which the members are solid bodies and to facilitate driving of them.

Although the numbers of the air passages 20*a*, 20*b* and lightening holes 21 are not limited to two and four as respectively shown in the drawing, it is preferable that the air passages 20*a*, 20*b* and lightening holes 21 are symmetric with respect to the axial center of the rod 13 to prevent the unbalanced load from acting on the rod 13.

As shown in FIGS. 1 and 2, the main body block 1 is provided with a supply port 23*a* of air for downward movement and a supply port 23*b* of air for upward movement for supplying compressed air to a pair of cylinder chambers 15*a* and 15*b* separated by the piston 12. Therefore, it is possible to move the piston 12 up and down by supplying compressed air from these ports 23*a* and 23*b*.

In order to avoid necessity of provision of a sealing member to the rod insertion hole 4 and to prevent generation of sliding resistance in the rod 13, an exhaust groove 18*c* communicating with the through hole 18*b* is formed at a lower portion of the rod insertion hole 4 in the main body block 1. The exhaust groove 18*c* is for preventing fluid in grooves 22*a* and 22*b* formed to face openings of the ports 24*a* and 24*b* from flowing into and out of the cylinder chamber 12*b* to affect driving of the piston 12.

In the fluid pressure cylinder, the piston 12 is inserted into the circular bearing hole 6*a* of the first air bearing 6 and the rod 13 is inserted into the rectangular bearing hole 9*a* of the second air bearing 9. However, in an actual cylinder production, it is extremely difficult to integrally form the circular piston 12 and the noncircular rod 13 while completely maintaining concentricity of the piston 12 and the rod 13 with each other and it is difficult to accurately process the air bearing 6 having the circular bearing hole 6*a* and the air bearing 9 having the rectangular bearing hole 9*a* such that the air bearing 6 and the air bearing 9 are concentric with each other. In order to accurately process the respective members to stably support the piston 12 and the rod 13 in floating states, a producing process becomes complicated and easy production at low cost is impossible.

Therefore, the air bearings 6 and 9 are mounted to the main body block 1 after individually processing the bearing surfaces of the respective bearing holes 6*a* and 9*a* by respective suitable methods without considering concentric accuracy too much. After individually forming the piston 12 and the rod 13 as separate parts, the piston 12 is kept concentric with the first air bearing 6 and the rod 13 is kept concentric with the second air bearing 9. In this state, the piston 12 and the rod 13 are integrated with each other by fixing the piston 12 and the rod 13 to each other through an adhesive 25.

As a method for connecting the piston 12 and the rod 13 as described above, in the example shown in the drawings, a hollow portion 26 of the piston 12 in the closed-end cylindrical shape is used as an adhesive housing portion in which the adhesive 25 is housed and the adhesive 25 is caused to seep between the junction faces 12*a* and 13*a* through a supply hole 27 formed in a bottom portion of the piston 12 to bond the piston 12 and the rod 13 to each other. At this time, the piston 12 and the rod 13 are respectively supported in the floating states by supplying compressed air to the respective air bearings 6 and 9 from the air supply port 16 and bonded to each other in this state.

The piston 12 and the rod 13 are provisionally fixed in a non-fixed state by provisionally fixing means such that the piston 12 and the rod 13 are not separated from each other in bonding and that the piston 12 and the rod 13 can move with respect to each other. In this state, it is preferable that the adhesive 25 penetrates to bond the piston 12 and the rod 13 to each other after aligning the respective air bearings with each other. In the embodiment shown in the drawings, the provisionally fixing means is formed of a bolt 14 and the bolt 14 is screwed down into the rod 13 in a non-fixed state through the supply hole 27 in the hollow portion 26 of the piston 12. The bolt 14 is eventually fixed to the piston 12 and the rod 13 through the adhesive 25. As a result, the piston 12 and the rod 13 are bonded to each other not only through the junction faces 12*a* and 13*a* but also through the bolt 14. Therefore, bonding strength of the piston 12 and the rod 13 increased substantially.

Thus, by fixing the piston 12 and the rod 13 to each other through the adhesive 25, even if the air bearings 6 and 9 mounted in the main body block 1 are not completely concentric with each other, it is possible to easily connect and mount the piston 12 and the rod 13 without loss of carrying functions in the floating states by adapting to a deviation of the axial centers of the air bearings 6 and 9 from each other.

Figure 4:
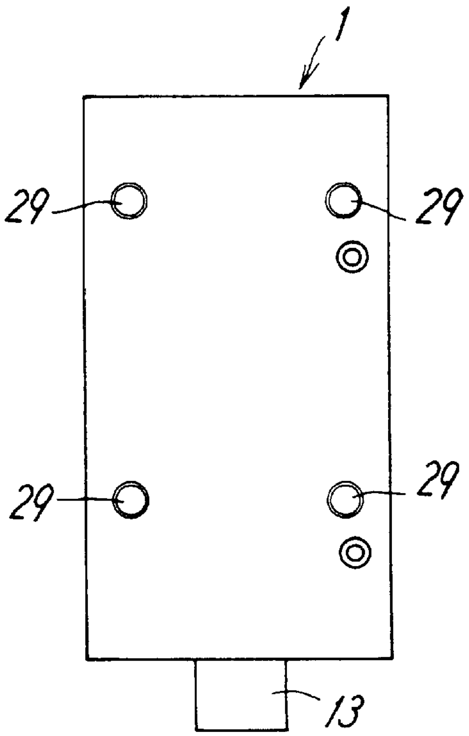
FIG. 4 is a back view of the embodiment.

A reference numeral 28 in FIG. 1 designates a damper mounted to an inner face of the cap 7 for damping a shock at a stroke end of the piston 12 and reference numerals 29 and 30 in FIGS. 4 and 5 designate mounting screw holes for mounting the main body block 1 to a proper member in and automatic device and the like.

The fluid pressure cylinder having the above structure alternately supplies compressed air from the supply ports 23*a* and 23*b* to the cylinder chambers 12*a* and 12*b* and supplies compressed air from the supply port 16 for bearing air to the air bearings 6 and 9. As a result, the piston 12 and the rod 13 move up and down in the drawing while being supported in the floating states. In this case, if weights of the piston 12 and the rod 13 are reduced by forming the piston 12 as the closed-end cylindrical body and by forming the plurality of lightening holes 21 in the rod 13, the rod 13 can be actuated with high frequency.

By connecting the supply port 24*a* for pressurizing air and provided to the main body block 1 to a compressed air source and by connecting the vacuum pressure port 24*b* to a vacuum source, it is possible to discharge compressed air from a tip end of the rod 13 through the air passages 20*a* and 20*b* provided to the rod 13 and to adsorb a desired workpiece by the rod 13.

According to the invention described above in detail, it is possible to accurately support the circular piston and the noncircular rod respectively by the air bearings such that the piston and the rod are concentric with each other, processing of the piston, rod, and the respective air bearings and mounting of them into the main body block are easy, and the fluid pressure cylinder can be obtained at low costs.

What is claimed is:

1. A fluid pressure cylinder comprising a main body block, a first air bearing provided on one side on an axis of said main body block, a second air bearing provided on the other side of said axis of said main block, a circular bearing hole formed in said first air bearing, a noncircular bearing hole formed in said second air bearing, a circular piston extending along the axis of the main body block and terminating in a junction face of the piston movably housed in said circular bearing hole, a noncircular rod extending along the axis of the main body block and terminating in a junction face of the rod movably housed in said noncircular bearing hole, and a mechanism for supplying compressed air into said bearing holes of said respective air bearings, wherein said piston and said rod are formed separately as separate parts and said piston and said rod are integrally connected to each other at the junction faces of the piston and rod through an adhesive in a state in which said piston is aligned to be concentric with said circular bearing hole of said first air bearing and said rod is aligned to be concentric with said noncircular bearing hole of said second air bearing.

2. A fluid pressure cylinder according to claim 1, wherein a weight of said rod is reduced by providing a plurality of holes for lightening in positions of said rod symmetric with respect to a center of said rod.

3. A fluid pressure cylinder according to claim 1, wherein said rod has an air passage for causing fluid pressure or vacuum pressure to act at a tip end portion of said rod.

4. A fluid pressure cylinder according to claim 1, wherein said piston has a housing portion for housing said adhesive and a supply hole for supplying said adhesive in said housing portion to the junction faces of said piston and said rod.

5. A fluid pressure cylinder according to claim 4, wherein said piston is in a closed-end cylindrical shape having therein a hollow portion that is said housing portion for said adhesive, said piston has said junction face and said supply hole connecting said junction face and said hollow portion at a bottom portion of said piston, and said rod has said junction face on an upper end face of said rod.

6. A fluid pressure cylinder comprising a main body block, a first air bearing provided on one side on an axis of said main body block, a second air bearing provided on the other side of said axis of said main block, a circular bearing hole formed in said first air bearing, a noncircular bearing hole formed in said second air bearing, a circular piston movably housed in said circular bearing hole, a noncircular rod movably housed in said noncircular bearing hole, a mechanism for supplying compressed air into said bearing holes of said respective air bearings, and fixing means for fixing said piston and said rod to each other for alignment in a non-fixed state, wherein said piston and said rod are formed separately as separate parts and said piston and said rod are integrally connected to each other through an adhesive in a state in which said piston is aligned to be concentric with said circular bearing hole of said first air bearing and said rod is aligned to be concentric with said noncircular bearing hole of said second air bearing.

7. A fluid pressure cylinder comprising a main body block, a first air bearing provided on one side on an axis of said main body block, a second air bearing provided on the other side of said axis of said main block, a circular bearing hole formed in said first air bearing, a noncircular bearing hole formed in said second air bearing, a circular piston movably housed in said circular bearing hole, a noncircular rod movably housed in said noncircular bearing hole, a mechanism for supplying compressed air into said bearing holes of said respective air bearings, and fixing means for fixing said piston and said rod to each other for alignment in a non-fixed state, wherein said piston and said rod are formed separately as separate parts and said piston and said rod are integrally connected to each other through an adhesive in a state in which said piston is aligned to be concentric with said circular bearing hole of said first air bearing and said rod is aligned to be concentric with said noncircular bearing hole of said second air bearing, wherein said piston has a housing portion for housing said adhesive and a supply hole for supplying said adhesive in said housing portion to junction faces of said piston and said rod, and wherein said piston is in a closed-end cylindrical shape having therein a hollow portion that is said housing portion for said adhesive, said piston has said junction face to which said rod is bonded and said supply hole connecting said junction face and said hollow portion at a bottom portion of said piston, and said rod has said junction face to be bonded to said junction face of said piston on an upper end face of said rod.

8. A fluid pressure cylinder according to claim 7, wherein said fixing means is formed of a bolt and said bolt is screwed down into said rod in a non-fixed state through said supply hole for said adhesive in said hollow portion in said piston.

* * * * *